United States Patent
Horton et al.

(10) Patent No.: US 10,602,383 B1
(45) Date of Patent: Mar. 24, 2020

(54) APPLICATION OF MACHINE LEARNING FOR BUILDING PREDICTIVE MODELS ENABLING SMART FAIL OVER BETWEEN DIFFERENT NETWORK MEDIA TYPES

(71) Applicant: Microsoft Technology Licensing, LLC, Redmond, WA (US)

(72) Inventors: Keith Edgar Horton, North Bend, WA (US); Harish Srinivasan, Sammamish, WA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 0 days.

(21) Appl. No.: 16/160,814

(22) Filed: Oct. 15, 2018

(51) Int. Cl.
*H04W 24/04* (2009.01)
*H04W 24/08* (2009.01)

(52) U.S. Cl.
CPC ........... *H04W 24/04* (2013.01); *H04W 24/08* (2013.01)

(58) Field of Classification Search
CPC .............................. H04W 24/04; H04W 24/08
See application file for complete search history.

(56) References Cited

U.S. PATENT DOCUMENTS

| 7,286,835 | B1* | 10/2007 | Dietrich | H04W 64/00 455/456.1 |
|---|---|---|---|---|
| 2002/0078263 | A1* | 6/2002 | Darling | G06F 9/5061 719/331 |
| 2013/0322329 | A1* | 12/2013 | Visuri | H04W 48/16 370/328 |
| 2014/0149781 | A1* | 5/2014 | Horman | G06F 11/1415 714/2 |
| 2016/0242140 | A1* | 8/2016 | Hopcraft | H04W 64/003 |
| 2018/0199218 | A1* | 7/2018 | Ashrafi | H04W 24/04 |
| 2018/0337709 | A1* | 11/2018 | Zou | H04B 7/024 |
| 2019/0028367 | A1* | 1/2019 | Tippenhauer | H04L 41/142 |

FOREIGN PATENT DOCUMENTS

| CN | 107466092 A | 12/2017 |
|---|---|---|
| EP | 3110198 A2 | 12/2016 |
| EP | 3352414 A1 | 7/2018 |
| WO | 2017184627 A2 | 10/2017 |

OTHER PUBLICATIONS

"International Search Report and Written Opinion Issued in PCT Application No. PCT/US19/052527", dated Dec. 9, 2019, 13 Pages.

* cited by examiner

*Primary Examiner* — Duc C Ho
(74) *Attorney, Agent, or Firm* — Mark K. Young; Mayer & Williams PC

(57) ABSTRACT

Computing devices are configured to passively monitor network stacks and protocols for a respective computing device, transmit metadata and statistics gathered by the monitoring to a remote service, and utilize a crowd-sourced heuristic model responsively generated by the remote service to proactively predict connectivity issues and connect to a best available network media and access device for the network media. A computing device's operating system may monitor various networking protocols without the computing device engaging in constant network activities (e.g., video streaming). The statistics obtained from this passive monitoring can be utilized by the remote service using various machine learning techniques to predict when networks will subsequently fail. Profiles are developed and sorted within the model to be used by individual computing devices to seamlessly connect to access devices based on performance, as opposed to connecting to the access device previously utilized by the user.

20 Claims, 14 Drawing Sheets

800

900

1100

APPLICATION OF MACHINE LEARNING FOR BUILDING PREDICTIVE MODELS ENABLING SMART FAIL OVER BETWEEN DIFFERENT NETWORK MEDIA TYPES

BACKGROUND

Computing devices with network connectivity can be limited to an individual connection, such as to a wireless access point or other layer two options (e.g., within the Open Systems Interconnection (OSI) model), until that connection fails. Prior to the connection failing, users may experience decreased connectivity performance which can result in inconvenience and confusion to the user.

SUMMARY

A computing device, such as a smartphone, tablet computer, or laptop, is configured to leverage a network heuristic model created by a remote service to proactively identify connectivity issues and connect to a best available access device and network media before a current connection fails. Available access devices include those that are operable within range of the computing device while inside a geofence. The remote service generates the network heuristics model using crowd-sourced data from a plurality of computing devices that each passively monitor and detect information for different communication protocols for a variety of network stacks (e.g., TCP/IP (Transmission Control Protocol/Internet Protocol), UDP (User Datagram Protocol), SMTP (Simple Mail Transfer Protocols), etc.). Performance for a connection can be determined by analyzing, for example, various quality of service (QoS) parameters including link speeds, packet loss, latency, or Round-Trip Time (RTT), as well as considering costs for metered connections. The remote service receives crowd-sourced data that includes, for example, statistics for different types of network media (e.g., Wi-Fi, ethernet, cellular/mobile), access devices (e.g., routers, switches, wireless access points, cell towers), types, brands, and models of computing devices used for a given connection, and software and hardware on a computing device that may affect connectivity.

Since capabilities and configurations can vary, different computing devices can perform differently with connections to the access devices that are operable inside a geofence. For example, one type of smartphone may have a more sensitive network interface that enables the smartphone to pick up weak Wi-Fi signals from a wireless access point at a given location. At the same location, a tablet computer that has a less sensitive network interface may perform poorly with the same wireless access point compared with the smartphone. In addition, performance of a wireless access point can vary over time. For example, the bandwidth available to a device can change with changing demand from device users.

The remote service aggregates the crowd-sourced data to build the heuristic model which is transmitted back to the computing devices so that each device can establish a self-learning loop. The computing device can leverage the heuristic model to select a connection providing the best performance, implement load balancing across the available connections operating inside a geofence, and/or fail-over to a new connection. The connections may be made to access devices associated with the same network media type or made to a new network media type entirely. For example, the device may switch between Wi-Fi connection and a mobile broadband connection. The network selection can be proactive to implement self-healing so that a new connection is established before the current connection is broken. Thus, the device can seamlessly distribute traffic across multiple connections using information gained from the heuristic model as needed to provide continuous connectivity that meets a desired QoS.

The heuristic model provides a reference which an operating system on a device may use to passively monitor different network stacks to determine a best possible connection operably inside a geofence. The computing device can either maintain a current connection or establish a new connection to a different access device using the same network media type or a different one. Useful information and insight into network performance may be realized by passively monitoring the behavior of protocols associated with various network stacks. Passive monitoring of the various utilized protocols includes observing the behaviors of those protocols during normal network operations without having to send out dedicated test data. Each network stack and protocol may be selectively observed and data for multiple different types of protocols can be aggregated at the remote service for analysis using machine learning techniques.

Profiles can be developed for the heuristic model using the machine learning to identify the access devices and network media types that perform best inside a current geofence of the computing device. The profiles can include contextual information so that the heuristic model can indicate, for example, which available connection provides the best performance (e.g., one or more of highest link speed, lowest latency and RTT, and lowest cost) at a given time.

The computing device can use the heuristic model and passive monitoring to predict poor connectivity and thereby proactively switch connections before the current connection to an access device fails or the device experiences decreased performance below some threshold. The failure or decreased performance may be anticipated, for example, by observing current data and comparing them against the respective reference profiles in the heuristic model. When decreased performance or failure is predicted, the computing device can implement self-healing features to avoid interruptions to the user's computing experience.

The utilization of the heuristic model and passive monitoring improves the technical operations of a computing device by preserving computing system resources which can be limited in some cases. Passive monitoring relies upon information that is already available on a device (but used for purposes other than heuristic modeling) to avoid the overhead associated with dedicated test traffic. A computing device can utilize the profiles to save time and resources in identifying appropriate alternative connections that are operable inside a geofence instead of having to locate and test connections on the fly. Thus, network bandwidth, battery power, processing cycles, and other resources can be efficiently utilized and preserved when scarce or expensive.

The heuristic model and passive monitoring further enhance the efficiency of the human-machine interface between the user and the device by ensuring seamless network connectivity using an automated process that can operate in the background. The proactive self-healing enabled by the heuristic model enables full engagement with a user experience without the user having to manually attempt to correct network connectivity issues. The automated processes reduce opportunities for input and other errors that are associated with manual operations of the device when connecting to a network and reduces time and efforts for the user to initiate and maintain network connectivity under changing conditions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

Like reference numerals indicate like elements in the drawings. Elements are not drawn to scale unless otherwise indicated.

DETAILED DESCRIPTION

Figure 1:
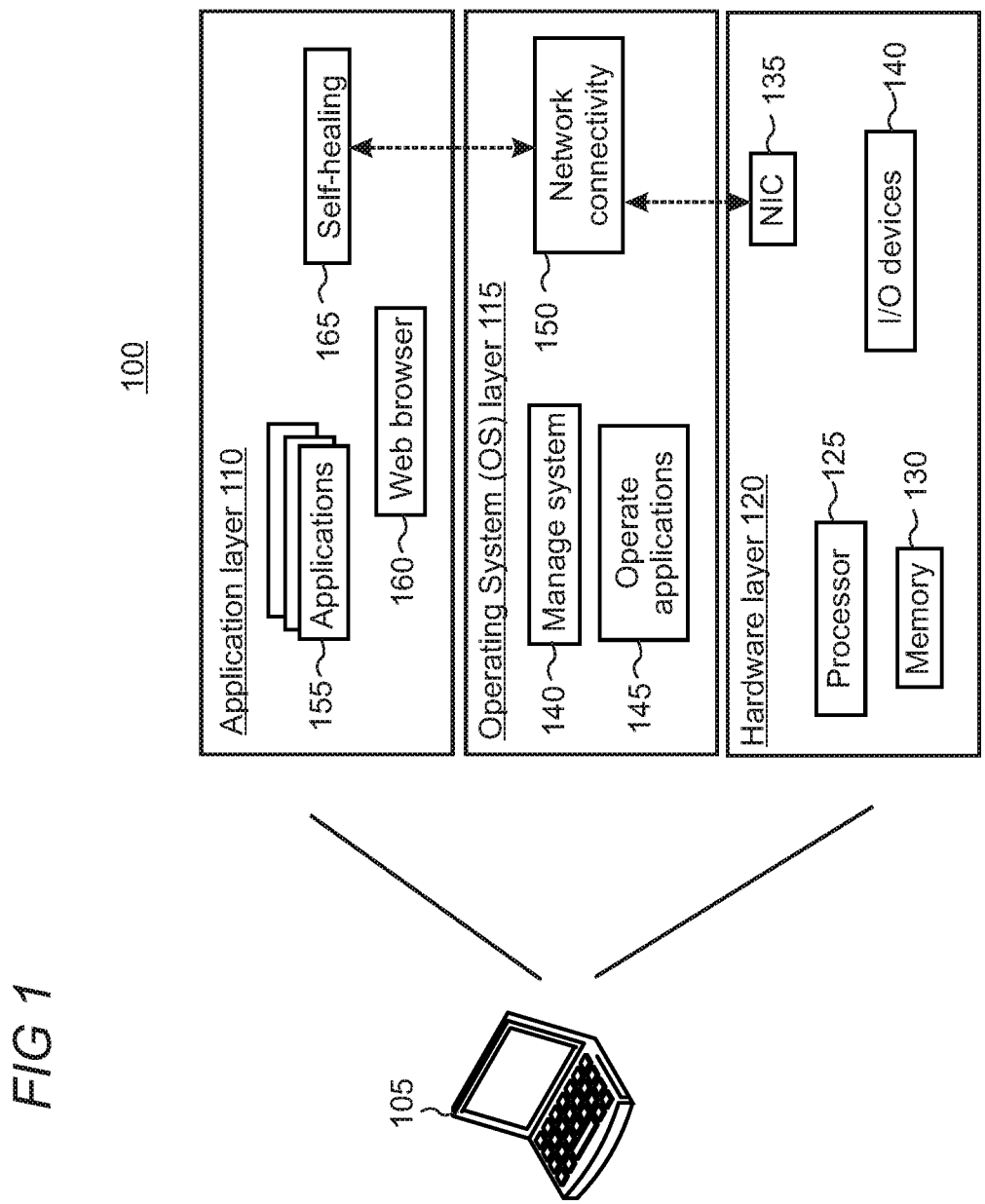
FIG. 1 shows an illustrative architecture of a computing device.

FIG. 1 shows an illustrative system architecture 100 for a computing device 105. The architecture is arranged in layers and includes a hardware layer 120, an operating system (OS) layer 115, and an application layer 110. The hardware layer 120 provides an abstraction of the various hardware used by the computing device 105 to the layers above it. In this illustrative example, the hardware layer supports one or more processors 125, memory 130, NIC (network interface controller) 135, and input/output devices 140. The NIC can include interfaces like a radio transceiver and port to enable ethernet, mobile broadband, or Wi-Fi connections to a network router, cell tower, or a wireless access point. The NIC may operate at the datalink layer (layer two) within the OSI (Open Systems Interconnections) model, or at the network interface layer within the TCP/IP model. The NIC may transport frames of data between network nodes (e.g., a router, switch, access point, etc.) using, for example, MAC (Media Access Control) addressing. The I/O devices can include a user interface and a keyboard, display, touchscreen display, speaker, microphone, etc. (not shown).

The application layer 110, in this illustrative example, supports various applications 155 including a web browser 160 and a self-healing application 165. Any number of applications can be utilized by the computing device 105, whether proprietary or third-party applications. The applications can be implemented using locally executing code. However, in some cases, applications can rely on services and/or remote code execution provided by remote servers or other computing platforms. The web browser may provide the user access to websites or services offered by other nodes of the network such as a remote server. The self-healing application may be configured to passively monitor the network stacks at the operating system to predict failure of a current network connection, and then initiate self-healing to automatically connect to a reliable access router or access point.

The OS layer 115 depicted in FIG. 1 supports, among other operations, managing the operating system 140 and operating applications 145. The OS layer may interoperate with the application and hardware layers to facilitate execution of programs and perform various functions and features. As network connectivity protocols and operations can span across the various layers, the OS is configured to handle network connectivity 150 functions. As depicted by the arrows in FIG. 1, the self-healing application can interoperate with the network connectivity functions executed by the operating system to passively monitor network stack layers and protocols for collection of metadata, statistics, and information.

Figure 2:
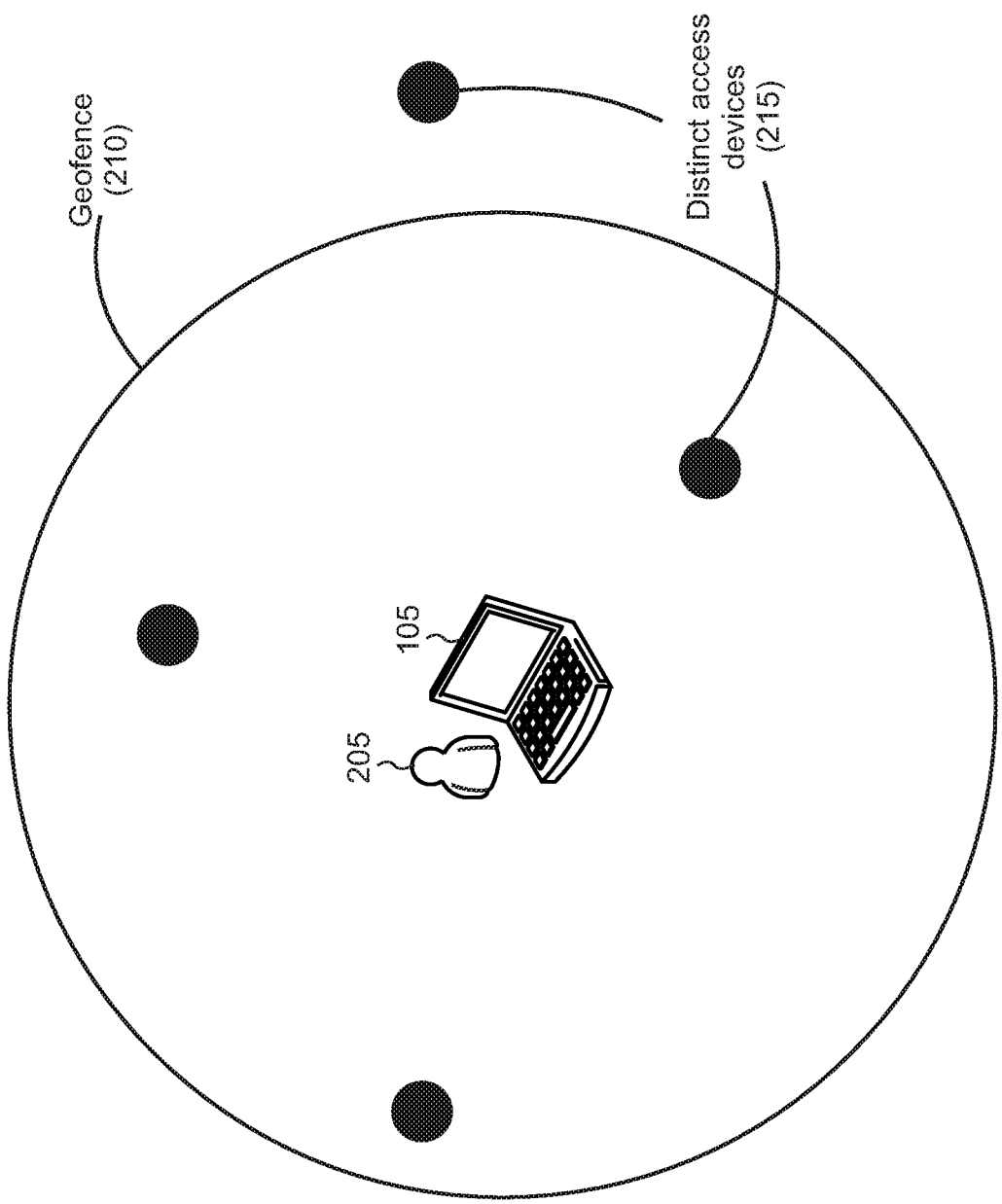
FIG. 2 shows an illustrative environment of multiple available access devices inside a geofence of the computing device.

FIG. 2 shows an illustrative environment in which a user 205 and the user's computing device 105 are inside a geofence 210. The computing device's location and geofence may be obtained, for example, using a GPS (global positioning system) or using their relative location to the various access devices 215 depicted in FIG. 2. The geofence may be a set distance for all computing devices or vary based on characteristics for the respective computing device (e.g., type, model, generation, hardware, and/or software, etc.). Various access devices 215 may operably be available to the computing device inside the user's geofence. The access devices may be, for example, routers or wireless access points which are in communication with modems to provide access to a local area network (LAN), wide area network (WAN), the internet, and ultimately the world wide web. The access devices may alternatively be configured, for example, as an ethernet connection or cell tower to respectively interoperate with different types of network media including wired ethernet or mobile broadband.

As shown in FIG. 2, the various access devices may be physically inside the geofence or be physically outside of the geofence but still within an operable range for use by the computing device. For example, radio signals may be exchanged between the access device (e.g., cell tower) and the computing device even though the access device is outside of the geofence. Thus, available access devices are operable inside the geofence but not necessarily physically located inside the geofence.

Figure 3:
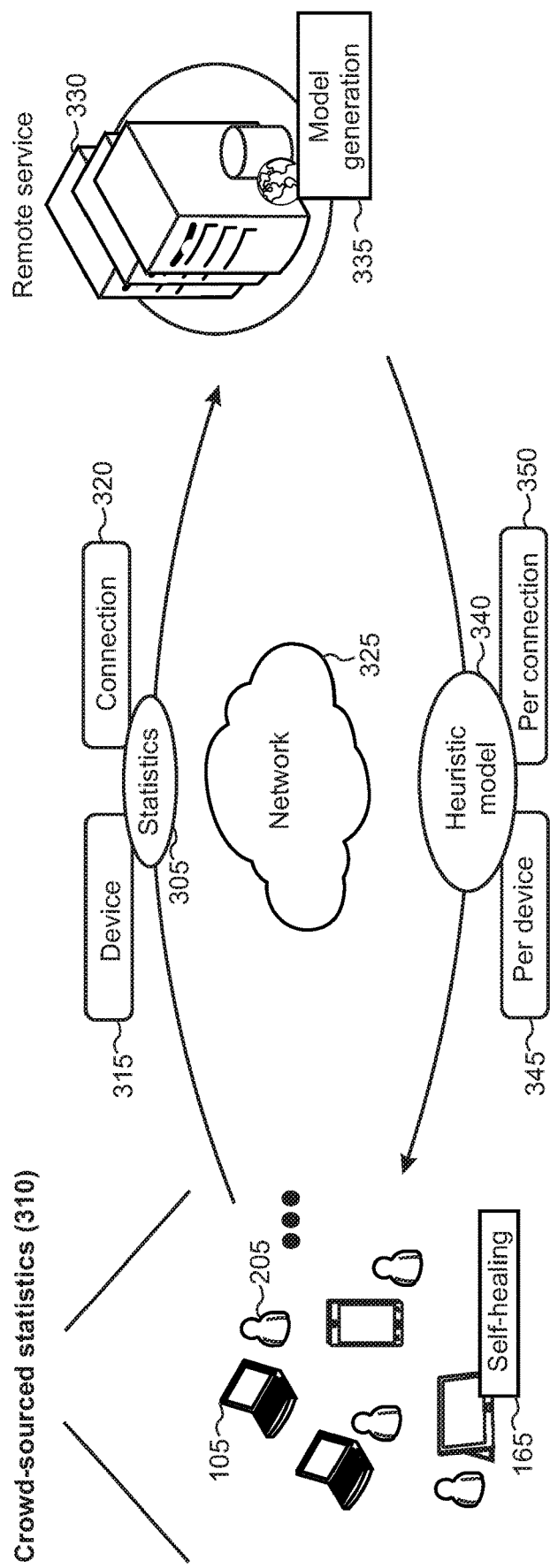
FIG. 3 shows an illustrative environment in which crowd-sourced statistics are transmitted to a remote service to responsively develop a heuristic model.

When the user 205 is connected to an access device using computing device 105, the computing device may automatically and passively monitor and gather data for the access device using, for example, the self-healing application 165 (FIG. 1). FIG. 3 shows an illustrative environment in which statistics 305 are gathered for a plurality of distinct computing devices 105 operated by a plurality of users 205, thereby having crowd-sourced statistics 310 as representatively shown. The statistics are gathered for each type of utilized device 315 and individual connection 320. Connections can be to different network media types entirely and specific access devices for network media types. For example, statistics can be gathered for different network media types including wireless, wired ethernet, and mobile broadband connections. Statistics are additionally gathered for the specific access device utilized for the given network media, including wireless access points, routers, cell towers, and the like. This data is transmitted over the network 325 (which may include LANs, WANs, and the Internet) to a remote service 330 comprised of one or more servers. The network 325 may be a current network connection used by the computing device, such as via a wireless access point, or may be any network connection that enables the statistics to be transmitted to the remote service. The computing device may be configured to send such heuristics in real-time as they are gathered, or at specific pre-determined times of the day.

The remote service 330 receives the statistical data and implements a model generation application 335 using various machine learning techniques. The generated heuristic model 340 which is sorted per device 345 and per connection 350 is transmitted to the plurality of computing devices for reference to proactively switch among connections, avoid failed or relatively lower performance connections, and utilize the connection with the greatest performance that is operable inside the respective device's geofence. The per connection information may be for access devices on the various network media types, such as wireless access points over a wireless interface or cell towers over mobile broadband.

Connection performance may be identified using various Quality of Service (QoS) parameters including link speed, Round-Trip Time (RTT), and bandwidth, among other parameters. In some implementations the model may be unique to the user's computing device, that is, the user may not receive a model with every possible device configuration, rather, the model may include that which is relevant to the specific device (e.g., similar software and hardware, generation of device, type of device in terms of laptop or mobile, etc.) The heuristic model and information may be sorted according to profiles so that devices can select the computing access device with increased performance relative to available access devices given the context.

Figure 4:
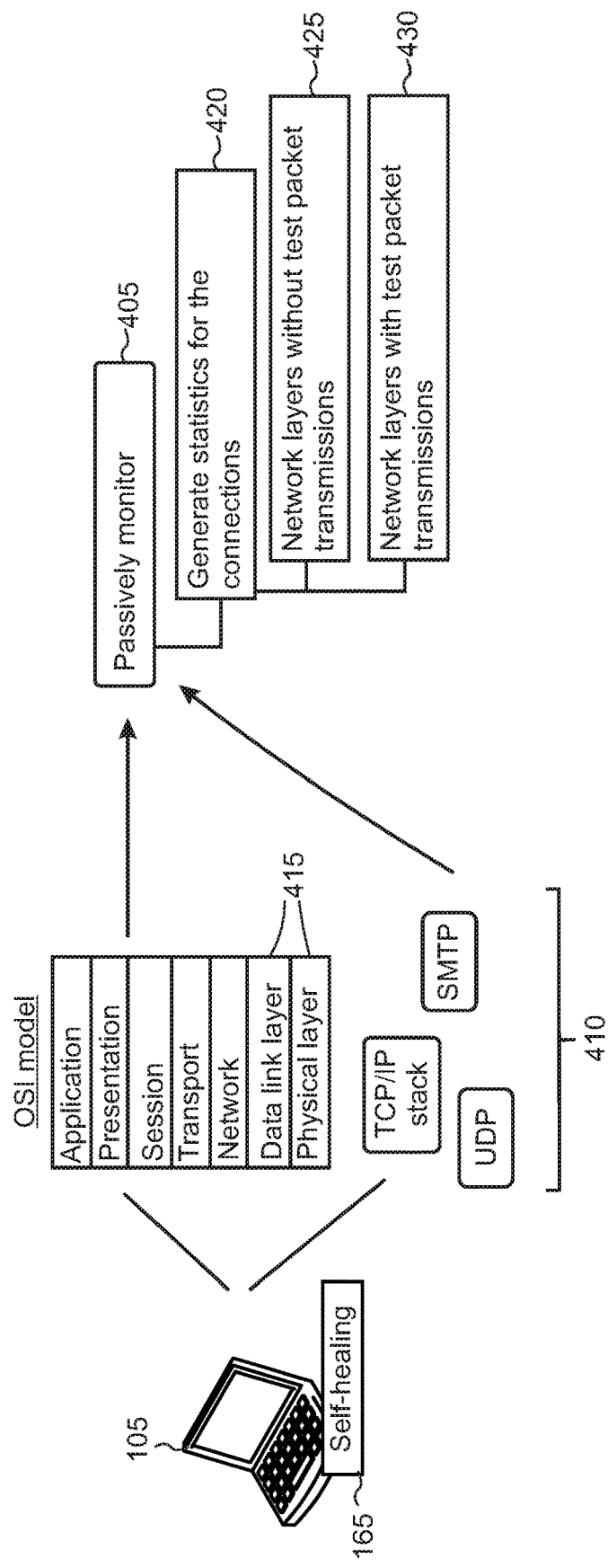
FIG. 4 shows an illustrative diagram of the computing device passively monitoring layers of a network stack to generate statistics.

FIG. 4 shows a diagram in which the computing device 105 passively monitors 405 the various layers 415 of the various network stacks 410. While the OSI model is depicted in FIG. 4 for reference, implemented network protocols which are passively monitored include a TCP/IP (Transmission Control Protocol/Internet Protocol) stack, SMTP (Simple Mail Transfer Protocol), UDP (User Datagram Protocol), among other network protocols. The various protocols that are implemented are individually and collectively monitored by the operating system of the computing device. The OSI model is abstractly shown for the various layers which may be analyzed in a given network stack.

Passive monitoring means that the operating system of the computing device monitors the various utilized protocols individually and collectively without necessarily sending out a test packet, but rather observing the behaviors of the utilized protocols during typical operations. Not every protocol within a given stack may be monitored, but rather, the OS may selectively identify and aggregate information which is deemed useful for identifying meaningful patterns that indicate connection failure before it occurs or the connection performs sub-optimally. Depending on the network stack, each layer or protocol may or may not be monitored and utilized. The passive monitoring of the layers may generate metadata, information, and statistics for the connection 420, including for the access device and the associated network media. As representatively shown, passive monitoring can occur at the network layers without test packet transmissions 425 and may additionally or alternatively be performed at the network layers with test packet transmissions 430.

Thus, for example, the user may be connected to an access point and not performing any network-related tasks, but the passive monitoring of the various network layers and implemented protocols can still provide valuable information and metadata regarding the performance of the current connection, at least with respect to the utilized computing device. For example, the operating system running layers of different network protocols may inherently perform operations such as re-transmits, latency information gathering, DNS (domain name service) queries, and gathering Round-Trip time (RTT) data for a given connection, without the device preparing and sending a test packet or requiring constant network utilization (e.g., video streaming). In other implementations, test data packet transmissions that may occur can be utilized as well for statistics such as to identify packet loss or RTT.

Figure 5:
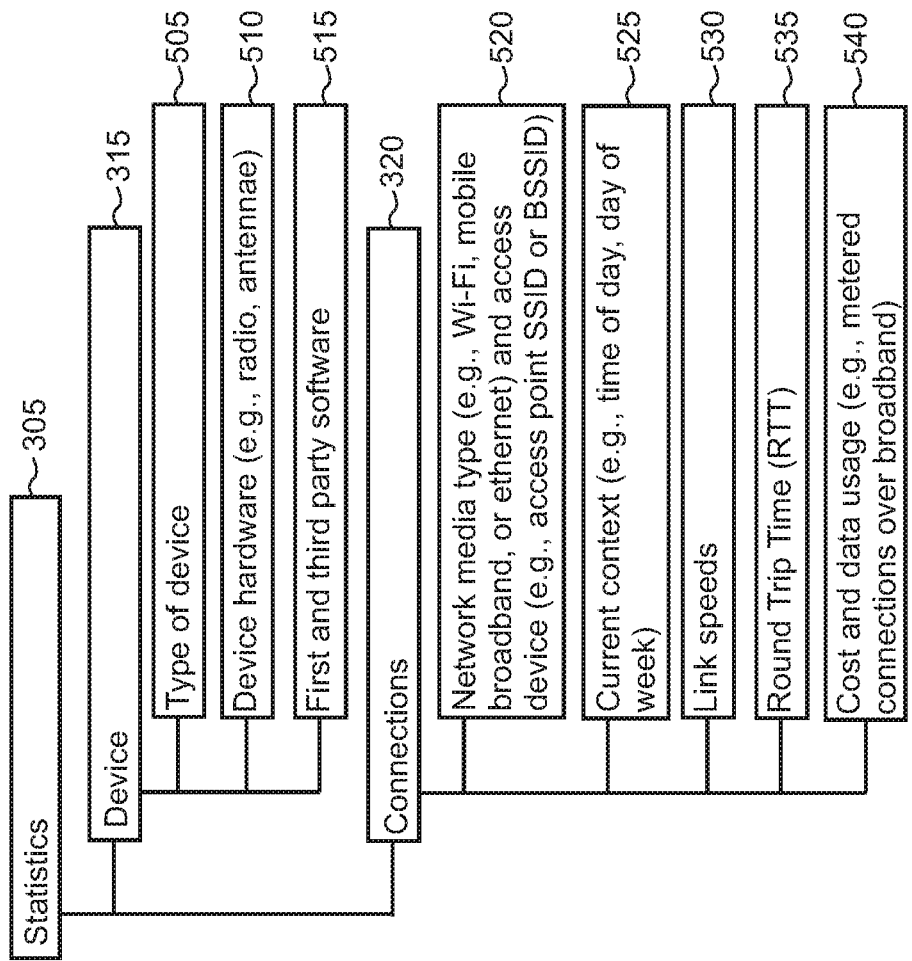
FIG. 5 shows a taxonomy of data tracked by a computing device.

FIG. 5 shows a taxonomy of statistics 305 for various characteristics associated with the device 315 and the connections 320 which may be gathered and transmitted to the remote service 330. Device-related information can include the type of device 505 (e.g., smartphone or laptop; make, model, and generation of computing device), type and configuration of device hardware (e.g., radio, antennae) 510, and type of first and third-party software executing on the computing device 515. Connection related information can include network media type (e.g., Wi-Fi, mobile broadband, or ethernet) and access device (e.g., access point SSID (service set identifier) or BSSID (basic service set identifier)) 520, current context (e.g., time of day, day of week) 525, link speeds 530, RTT 535, and cost and data usage (e.g., for metered connections over mobile broadband) 540. All of this data, metadata, and information can be collected by individual computing devices and transmitted to the remote service.

Figure 6:
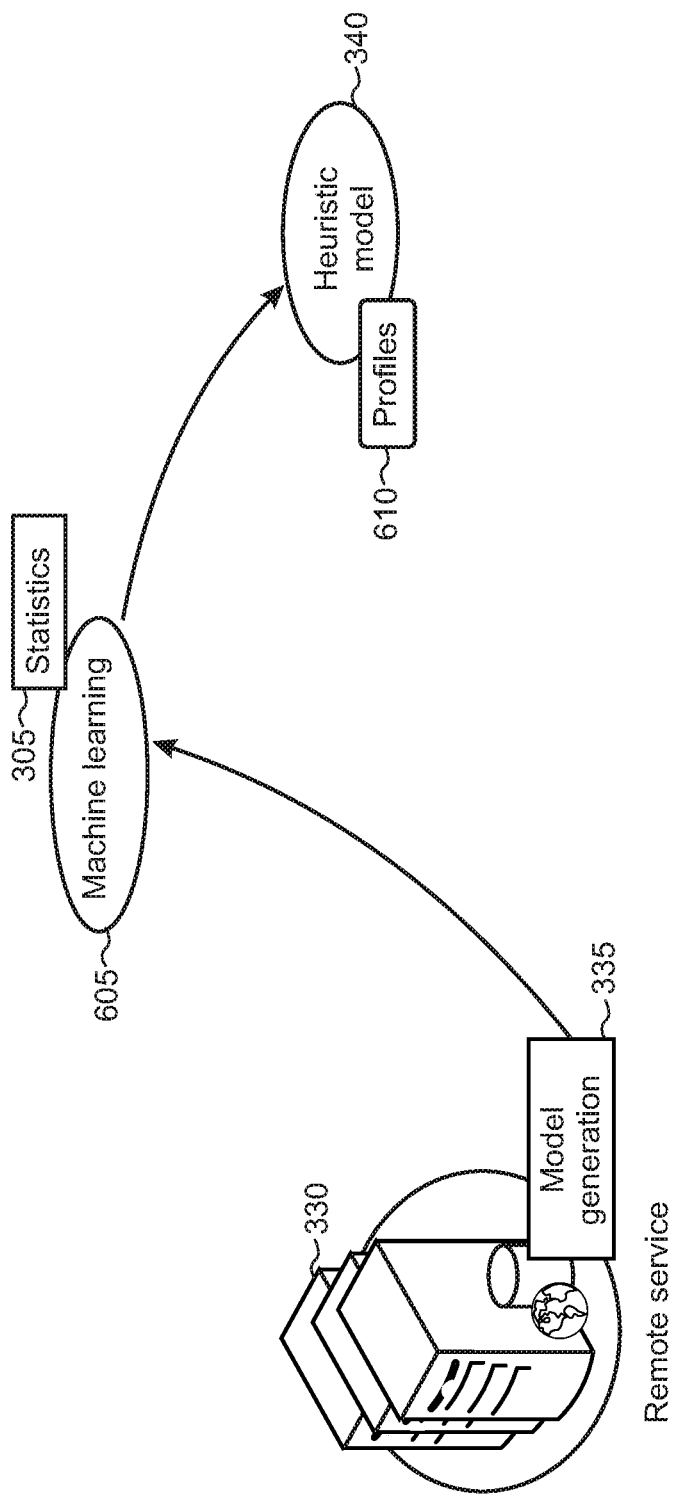
FIG. 6 shows an illustrative diagram in which the remote service utilizes machine learning techniques on the crowd-sourced statistics to develop a model.

FIG. 6 shows an illustrative environment in which the model generation application 335 utilizes machine learning 605 on the crowd-sourced statistics 305 to build a heuristic model 340 that enables computing devices to proactively utilize the best possible available access device and associated network media in terms of performance (e.g., high link speeds and low RTT). The remote service can use the various statistics generated from computing devices while monitoring the various network layers and stacks. The remote service can utilize the information for the network stacks individually and collectively and for specific layers within respective network stacks.

The machine learning algorithms can learn from the received historical information of the connections to determine a model of, for example, which types of computing devices and access devices provide users with the greatest user experience and network connectivity performance. Profiles 610 can be developed for network media types, access devices for the network media, and computing devices and sorted so that a user's computing device, based on the available connections that is operable inside their geofence, can automatically establish a connection with the highest performance network media and access device as opposed to the that which was utilized by the user on a previous occasion.

Profiles are developed for specific access devices and different types of network media, or access devices, network media, and different types of computing devices (FIG. 5). For example, profiles with computing devices that share at least some characteristics of the user's computing device can be informative as to how the user's device will react and perform. Common characteristics can include software, hardware (e.g., type of transceiver), or type of device (e.g., make, model, device generation). This way the specific user's computing device utilizes a like profile within the model to properly identify a relevant network media and access device. For example, a user with a low powered NIC may use a profile for a computing device that similarly uses a low powered NIC, and may not have use for a profile in which the utilized computing device uses a high-powered NIC.

Various unsupervised, supervised, and reinforcement learning techniques can be implemented, including by way of example clustering, classification, and regression depending on the given scenario. Thus, the remote service can receive data from potentially thousands or millions of users and user devices and apply various machine learning techniques to organize, parse, learn, and make use out of the data in the form of the heuristic model. For example, the remote service may learn that certain connections provide greater or lesser performance at certain times of day, with certain computing devices or software, etc. This information can then be utilized by computing devices operated by end users which can identify a profile and connection which has been identified as the best (e.g., delivers highest transfer speeds) in the given situation.

Figure 7:
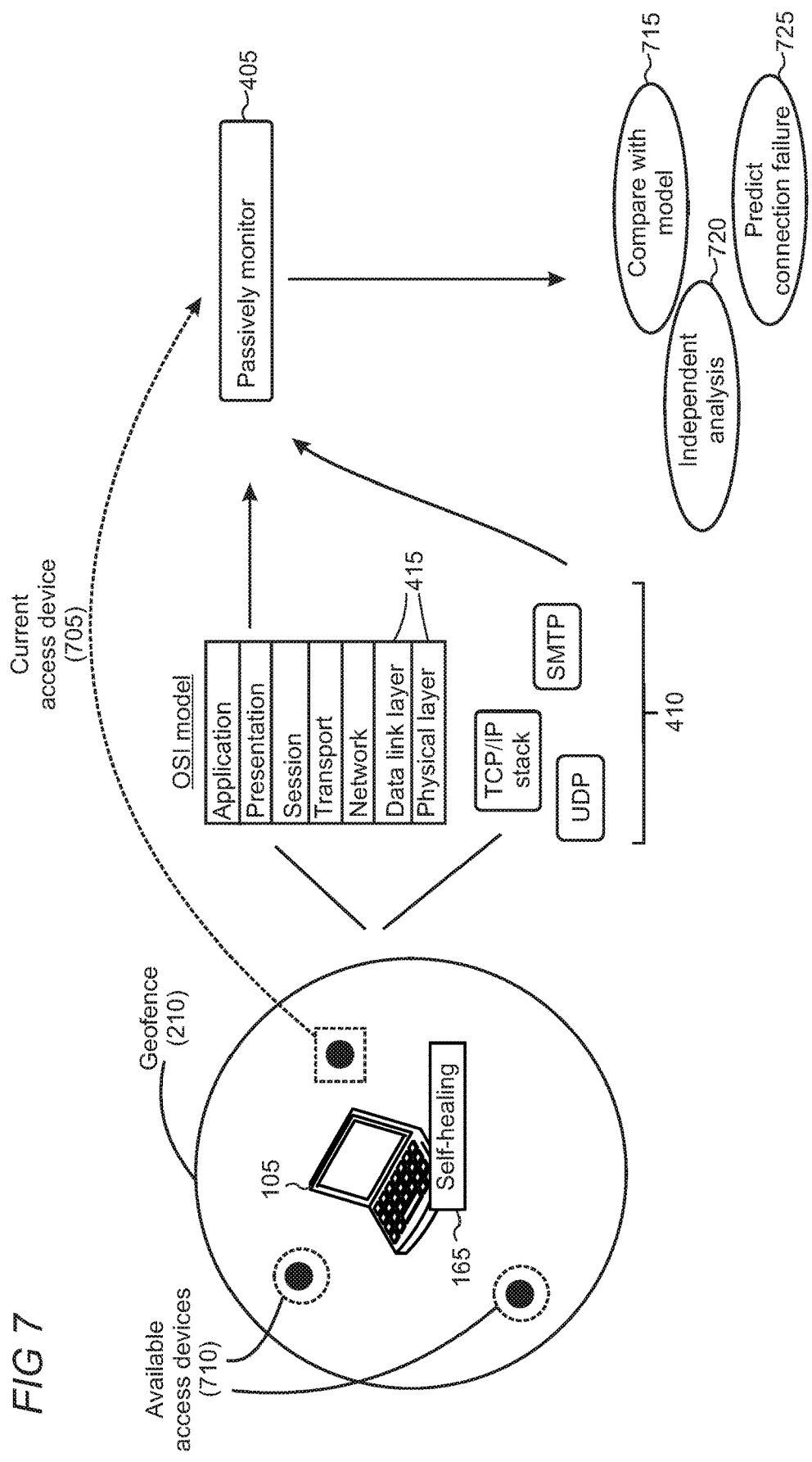
FIG. 7 shows an illustrative environment in which the computing device passively monitors a current connection to an access device and performs various functions using the developed model from the remote service.

FIG. 7 shows an illustrative environment in which the computing device 105 is operable inside the geofence 210 in which a plurality of access devices are available to the computing device for connection and utilization. In this example the self-healing application 165 is able to use the heuristic model which was generated by the remote service. The computing device uses a current connection to access device 705, for which the network stack is passively monitored to collect metadata, information, and statistics. The discussion for the passive monitoring discussed above with respect to FIG. 4 applies here as well. The current connection can be a specific network media and access device, such as a wireless connection to an access point or router. The information obtained during the passive monitoring can continue to be transmitted to the remote service for continued learning and updating of the heuristic model. Additionally, the computing device can compare its collected information with that which is contained in the received model, perform its own independent analysis of an access device, and predict the occurrence of connection failure before operations become interrupted, as representatively shown by numerals 715, 720, and 725.

Utilizing the model and the real-time generated statistics can indicate to the computing device 105 that the current connection to the access device 705 may be sub-optimal relative to other available access devices 710. For example, monitoring the network layers or protocols 415 local to the computing device may indicate that a current connection is experiencing greater latency than typical according to the information contained within the model for that connection. By referencing the model, the computing device can identify and fail-over onto another available network media type or access device on the same network media that provides lower latency relative to the currently utilized connection. The model can also indicate which available connection is optimal for similar types of computing devices. Connection failure may be based on issues local to the access device itself (e.g., the router or cell tower) or the network infrastructure on which the access device operates.

Using the model, the computing device can also identify signs and thereby predict when a connection may fail before failure occurs, that is, no longer provides network or internet connectivity. For example, certain passive characteristics, such as an incremental increase in RTT or other passively identified parameters, exhibited by certain network layers may indicate that a connection may subsequently fail. Data packet failure or DNS query failures can also be used as indications of a potential connection failure if the information is available. When the observations of one or more layers of the network stack provide an indication that the current connection may subsequently fail, the computing device's operating system can instruct the NIC to select another available connection. The computing device may reference the model to identify the access device that may provide the greatest possible network or internet connectivity performance for that specific type of computing device or computing device's hardware or software.

Figure 8:
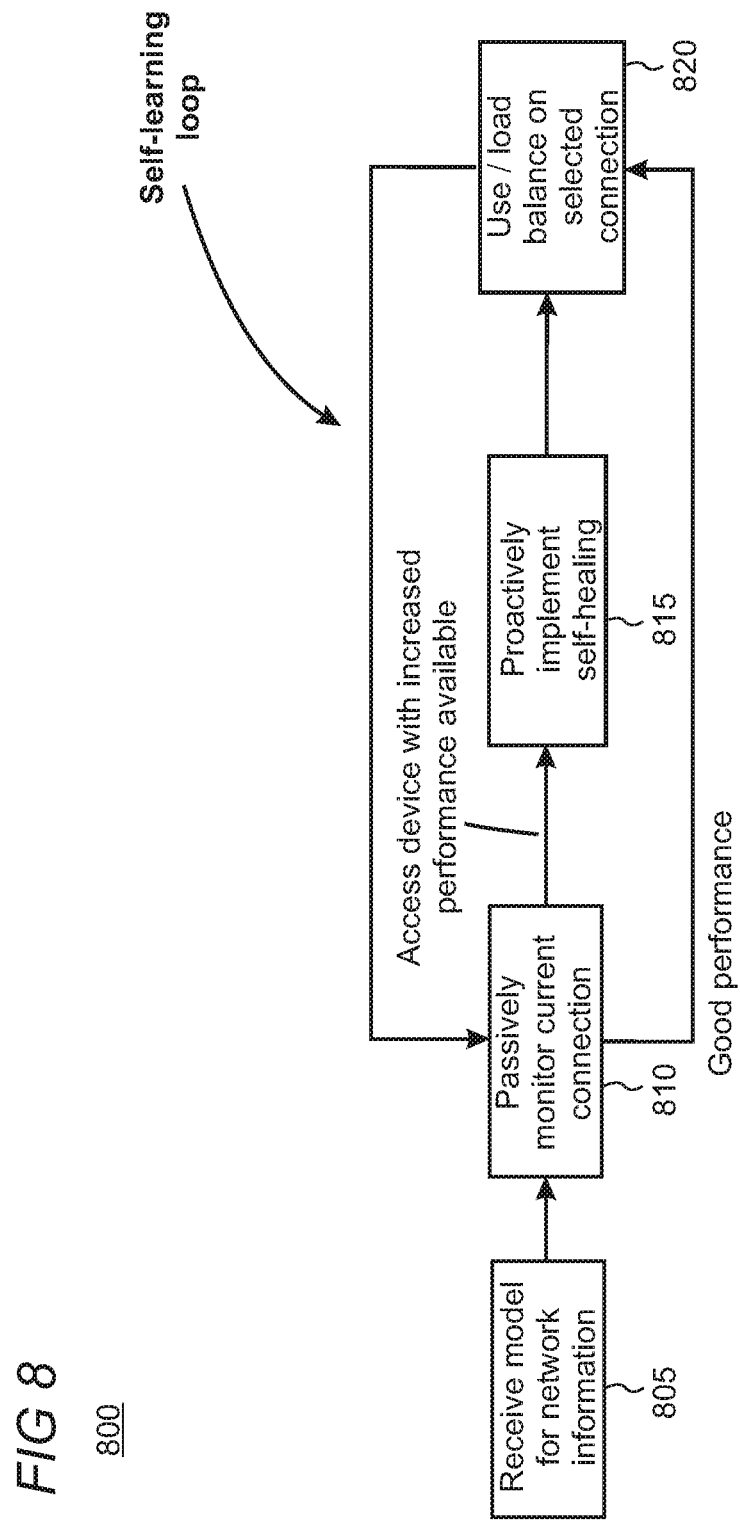
FIG. 8 shows an illustrative flowchart depicting a self-learning loop so the computing device proactively selects or fails over to a best available connection.

FIG. 8 shows an illustrative flowchart 800 of a computing device executing a self-learning loop to constantly and passively detect current connection performance, predict potential connection failure before it occurs, and proactively fail-over to another connection or load balance across available connections without interrupting the user's experience. Load balancing or switching among connections can be done across network media types or access devices on the same network media. For example, the computing device can load balance or switch from a wireless connection to an ethernet connection, and among access points for a wireless connection. In step 805, the computing device receives the heuristic model from the remote service. In step 810, the computing device passively monitors the utilized network protocols to monitor performance of the current connection to the access device.

In an embodiment, if the connection performance satisfies a threshold (e.g., latency or RTT are below a threshold and/or link speeds are above a threshold), then the computing device may maintain the connection and advance to step 820, in which the computing device uses the same connection. If the connection performance fails to satisfy the threshold or the model indicates that another available connection that is operable inside the user's geofence is more reliable or provides greater performance, then the computing device may advance to step 815. In step 815, the computing device proactively implements self-healing to avoid interrupting the computing experience. For example, the operating system may instruct the NIC to automatically select or fail-over to a new access device with relatively increased performance. The new connection can be to a different network media or to a new access device on the same network media.

In step 820, the computing device automatically uses or load balances on the selected connection. The computing device repeats steps 810, 815, and 820 to continuously monitor the health of the connections, proactively identify failing connections or connections with a decreased performance before they occur, and proactively establish a new connection before the user experiences any connectivity issues. The computing device may periodically receive updated models for reference as well (step 805). The computing device may elect to load balance over a series of available connections while passively monitoring each utilized one until the computing device identifies a best or improved available connection. In some implementations in which costs or data limits are associated with a metered connection, such as over mobile broadband, the computing device may elect to maintain a Wi-Fi connection instead of consuming data and incurring costs over the mobile broadband network, even if the Wi-Fi connection is providing a lower QoS. The computing device thereby utilizes the heuristic model while simultaneously exercising real-time analysis and reacting to the characteristics associated with the connections.

The user's computing device's may also be configured with a user interface (UI) that exposes controls to enable the user to make smart decisions on preferences. These include, for example, overriding the profile information contained within the heuristic model. The user can, for example, override the network connection utilized from the self-healing procedures and select an alternative connection. Such user input can be learned and stored by the self-healing application to thereby utilize the user's network connection preferences for that location on future occasions.

Figure 9:
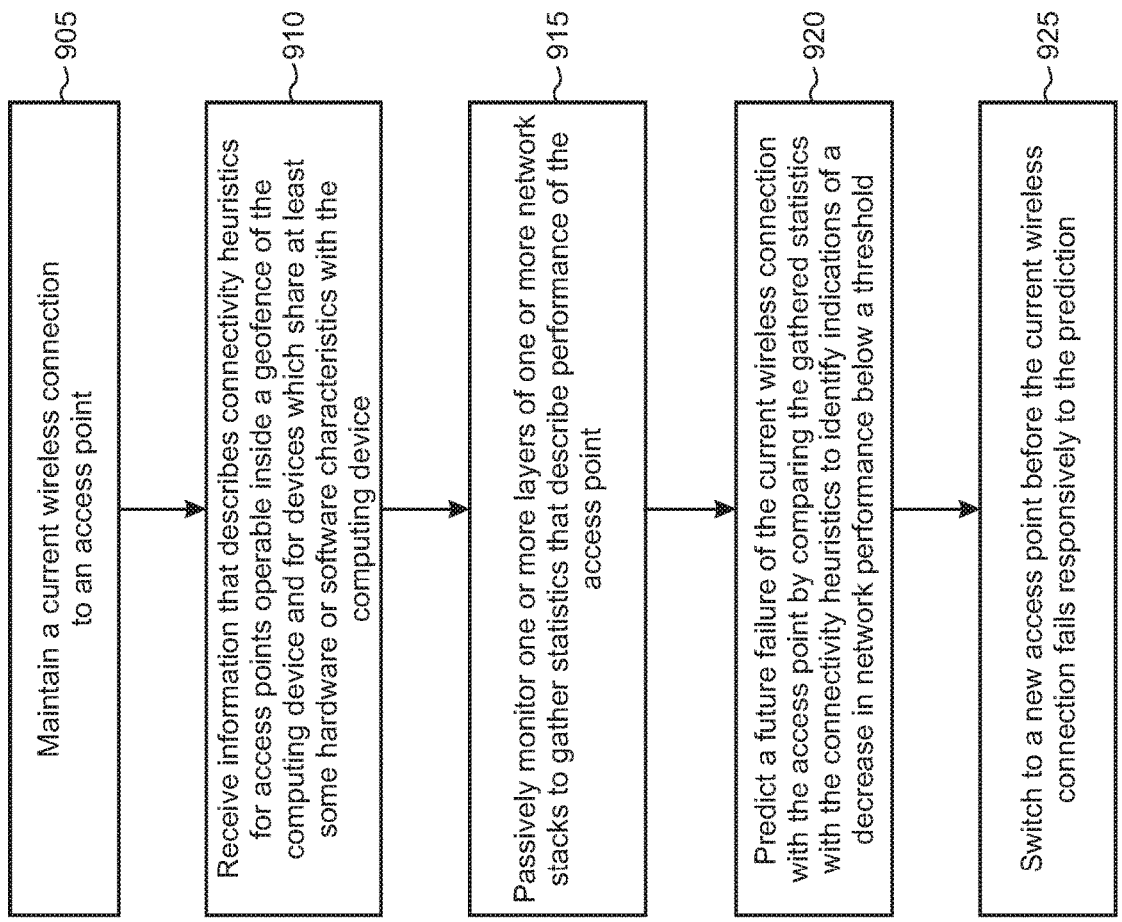
FIGS. 9-11 show illustrative processes performed by the user's computing device or the remote server.

FIG. 9 is a flowchart of an illustrative method 900 that a computing device, such as a smartphone, tablet computer, or laptop computer may perform. Unless specifically stated, methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 905, a current wireless connection to an access point is maintained by the computing device. In step 910, information that describes connectivity statistics is received. The statistics can describe (i) network access points that are operable inside a geofence of the client computing device, and (ii) devices which share at least some hardware or software characteristics with the computing device. In step 915, one or more layers of multiple network stacks are passively monitored to gather statistics for the network access point. In step 920, a prediction is made as to whether the wireless connection with the access point will fail using the gathered statistics and the received information as a reference to the gathered statistics. In step 925, responsive to the prediction that the wireless connection with the access point will fail, the computing device proactively switches to a new access point before the wireless connection fails.

Figure 10:
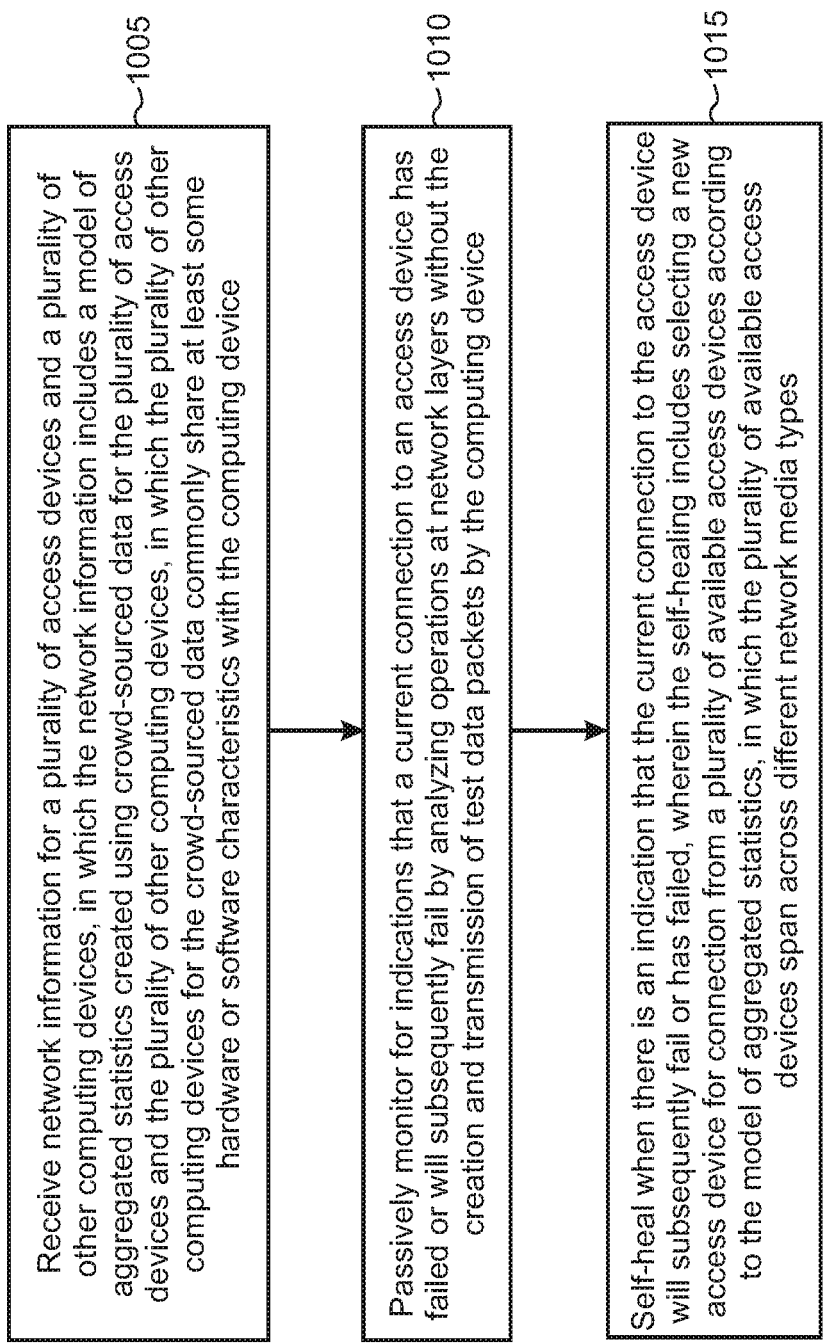

FIG. 10 is a flowchart of an illustrative method 1000 that a computing device may perform. In step 1005, the computing device receives network information for a plurality of access devices and a plurality of other computing devices. The network information may be a model of aggregated statistics created using crowd-sourced data based on the plurality of access devices and the plurality of other computing devices. In step 1010, the received network information is used to passively monitor for indications that a current access device connection has failed or will subsequently fail by monitoring the computing device's operating system. In step 1015, the computing device self-heals when there is an indication that the current access device connection will subsequently fail or has already failed.

Figure 11:
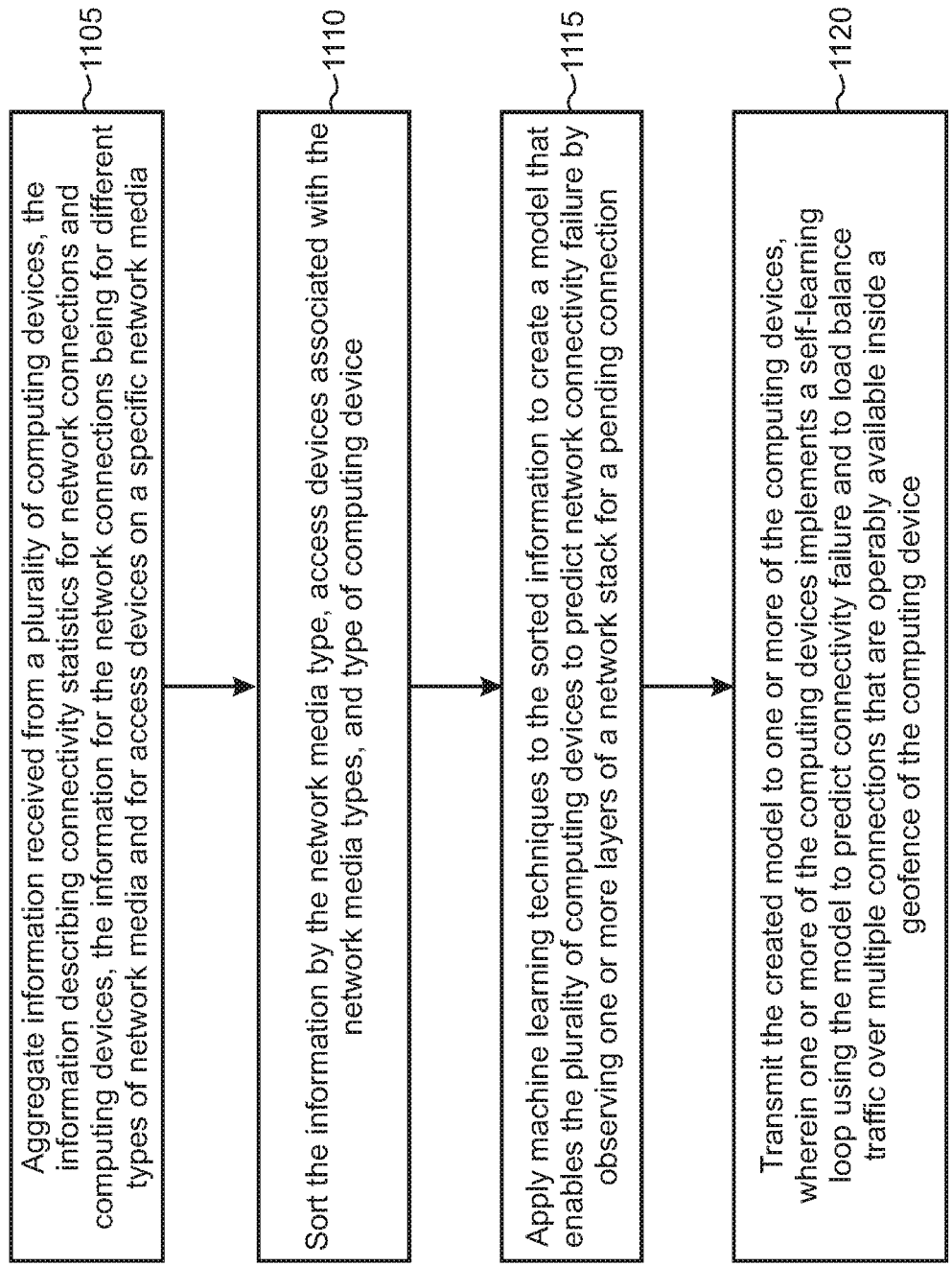

FIG. 11 is a flowchart of an illustrative method 1100 that a remote service may perform, for example using a computer server or suitable computing device. In step 1105, the remote service receives and aggregates information from a plurality of computing devices that describe connectivity statistics for connections and user devices. The information for the connections can be for different types of network media and access devices for a specific network media. In step 1110, the information is sorted by network media type, access devices for the network media types, and type of user device. In step 1115, the remote service applies machine learning techniques to the sorted information to create a model that enables the plurality of computing devices to predict connectivity failure for a pending connection. In step 1120, the created model is transmitted to one or more of the computing devices.

Figure 12:
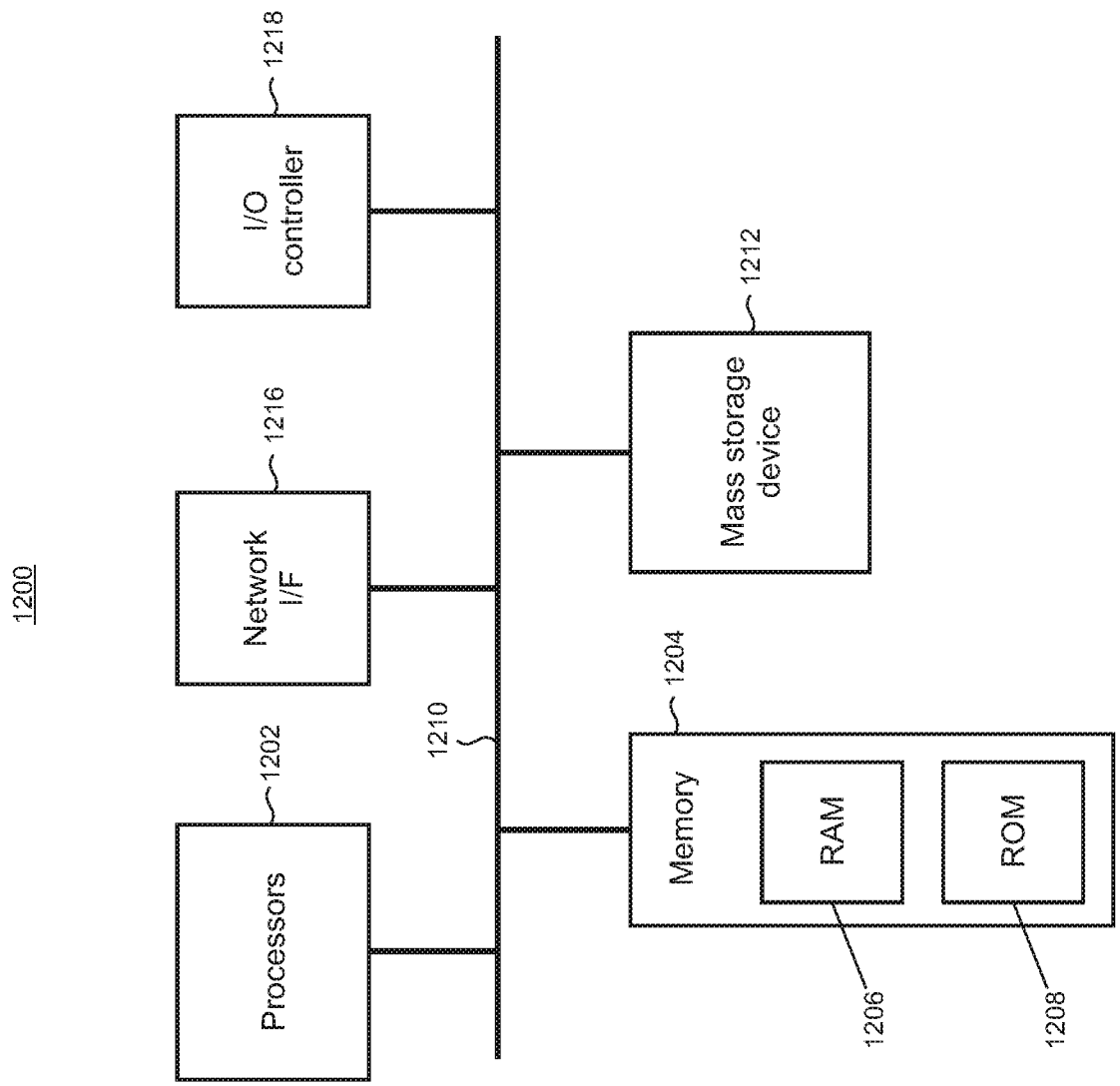
FIG. 12 is a simplified block diagram of an illustrative computing device that may be used in part to implement the present application of machine learning for building predictive models enabling smart failover between different network media types.

FIG. 12 shows an illustrative architecture 1200 for a device capable of executing the various components and operations described herein for the present application of machine learning for building predictive models enabling smart failover between different network media types. The architecture 1200 illustrated in FIG. 12 includes one or more processors 1202 (e.g., central processing unit, dedicated AI chip, graphic processing unit, etc.), a system memory 1204, including RAM (random access memory) 1206 and ROM (read only memory) 1208, and a system bus 1210 that operatively and functionally couples the components in the architecture 1200. A basic input/output system containing the basic routines that help to transfer information between elements within the architecture 1200, such as during startup, is typically stored in the ROM 1208. The architecture 1200 further includes a mass storage device 1212 for storing software code or other computer-executed code that is utilized to implement applications, the file system, and the operating system. The mass storage device 1212 is connected to the processor 1202 through a mass storage controller (not shown) connected to the bus 1210. The mass storage device 1212 and its associated computer-readable storage media provide non-volatile storage for the architecture 1200. Although the description of computer-readable storage media contained herein refers to a mass storage device, such as a hard disk or CD-ROM drive, it may be appreciated by those skilled in the art that computer-readable storage media can be any available storage media that can be accessed by the architecture 1200.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 1200.

According to various embodiments, the architecture 1200 may operate in a networked environment using logical connections to remote computers through a network. The architecture 1200 may connect to the network through a network interface unit 1216 connected to the bus 1210. It may be appreciated that the network interface unit 1216 also may be utilized to connect to other types of networks and remote computer systems. The architecture 1200 also may include an input/output controller 1218 for receiving and processing input from a number of other devices, including a keyboard, mouse, touchpad, touchscreen, control devices such as buttons and switches or electronic stylus (not shown in FIG. 12). Similarly, the input/output controller 1218 may provide output to a display screen, user interface, a printer, or other type of output device (also not shown in FIG. 12).

The architecture 1200 may include a voice recognition unit (not shown) to facilitate user interaction with a device supporting the architecture through voice commands, a natural language interface, or through voice interactions with a personal digital assistant (such as the Cortana® personal digital assistant provided by Microsoft Corporation). The architecture 1200 may include a gesture recognition unit (not shown) to facilitate user interaction with a device supporting the architecture through sensed gestures, movements, and/or other sensed inputs.

It may be appreciated that the software components described herein may, when loaded into the processor 1202 and executed, transform the processor 1202 and the overall architecture 1200 from a general-purpose computing system into a special-purpose computing system customized to facilitate the functionality presented herein. The processor 1202 may be constructed from any number of transistors or other discrete circuit elements, which may individually or collectively assume any number of states. More specifically, the processor 1202 may operate as a finite-state machine, in response to executable instructions contained within the software modules disclosed herein. These computer-executable instructions may transform the processor 1202 by specifying how the processor 1202 transitions between states, thereby transforming the transistors or other discrete hardware elements constituting the processor 1202.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 1200 in order to store and execute the software components presented herein. It also may be appreciated that the architecture 1200 may include other types of computing devices, including wearable devices, handheld computers, embedded computer systems, smartphones, PDAs, and other types of computing devices known to those skilled in the art. It is also contemplated that the architecture 1200 may not include all of the components shown in FIG. 12, may include other components that are not explicitly shown in FIG. 12, or may utilize an architecture completely different from that shown in FIG. 12.

Figure 13:
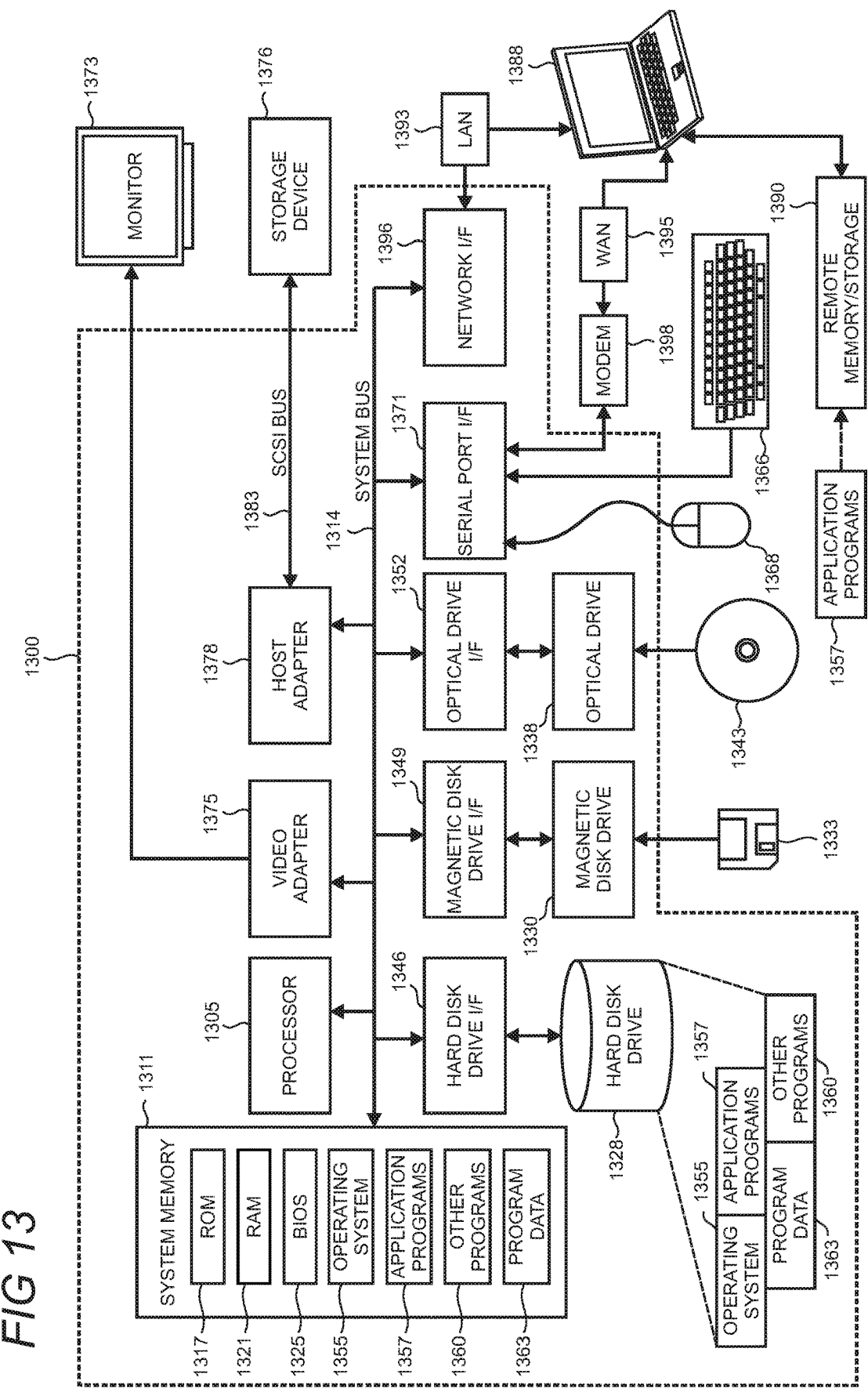
FIG. 13 is a simplified block diagram of an illustrative computer system or server may be used in part to implement the present application of machine learning for building predictive models enabling smart failover between different network media types.

FIG. 13 is a simplified block diagram of an illustrative computer system 1300 such as a server which may be used to implement the present application of machine learning for building predictive models enabling smart failover between different network media types. Computer system 1300 includes a processor 1305, a system memory 1311, and a system bus 1314 that couples various system components including the system memory 1311 to the processor 1305. The system bus 1314 may be any of several types of bus structures including a memory bus or memory controller, a peripheral bus, or a local bus using any of a variety of bus architectures. The system memory 1311 includes read only memory (ROM) 1317 and random access memory (RAM) 1321. A basic input/output system (BIOS) 1325, containing the basic routines that help to transfer information between elements within the computer system 1300, such as during startup, is stored in ROM 1317. The computer system 1300 may further include a hard disk drive 1328 for reading from and writing to an internally disposed hard disk (not shown), a magnetic disk drive 1330 for reading from or writing to a removable magnetic disk 1333 (e.g., a floppy disk), and an optical disk drive 1338 for reading from or writing to a removable optical disk 1343 such as a CD (compact disc), DVD (digital versatile disc), or other optical media. The hard disk drive 1328, magnetic disk drive 1330, and optical disk drive 1338 are connected to the system bus 1314 by a hard disk drive interface 1346, a magnetic disk drive interface 1349, and an optical drive interface 1352, respectively. The drives and their associated computer-readable storage media provide non-volatile storage of computer-readable instructions, data structures, program modules, and other data for the computer system 1300. Although this illustrative example includes a hard disk, a removable magnetic disk 1333, and a removable optical disk 1343, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present application of machine learning for building predictive models enabling smart failover between different network media types. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are non-transitory and do not include waves, signals, and/or other transitory and/or intangible communication media.

A number of program modules may be stored on the hard disk, magnetic disk, optical disk, ROM 1317, or RAM 1321, including an operating system 1355, one or more application programs 1357, other program modules 1360, and program data 1363. A user may enter commands and information into the computer system 1300 through input devices such as a keyboard 1366 and pointing device 1368 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 1305 through a serial port interface 1371 that is coupled to the system bus 1314, but may be connected by other interfaces, such as a parallel port, game port, or universal serial bus (USB). A monitor 1373 or other type of display device is also connected to the system bus 1314 via an interface, such as a video adapter 1375. In addition to the monitor 1373, wearable devices and personal computers can typically include other peripheral output devices (not shown), such as speakers and printers. The illustrative example shown in FIG. 13 also includes a host adapter 1378, a Small Computer System Interface (SCSI) bus 1383, and an external storage device 1376 connected to the SCSI bus 1383.

The computer system 1300 is operable in a networked environment using logical connections to one or more remote computers, such as a remote computer 1388. The remote computer 1388 may be selected as a personal computer, a server, a router, a network PC, a peer device, or other common network node, and typically includes many or all of the elements described above relative to the computer system 1300, although only a single representative remote memory/storage device 1390 is shown in FIG. 13. The logical connections depicted in FIG. 13 include a local area network (LAN) 1393 and a wide area network (WAN) 1395. Such networking environments are often deployed, for example, in offices, enterprise-wide computer networks, intranets, and the Internet.

When used in a LAN networking environment, the computer system 1300 is connected to the local area network 1393 through a network interface or adapter 1396. When used in a WAN networking environment, the computer system 1300 typically includes a broadband modem 1398, network gateway, or other means for establishing communications over the wide area network 1395, such as the Internet. The broadband modem 1398, which may be internal or external, is connected to the system bus 1314 via a serial port interface 1371. In a networked environment, program modules related to the computer system 1300, or portions thereof, may be stored in the remote memory storage device 1390. It is noted that the network connections shown in FIG. 13 are illustrative and other means of establishing a communications link between the computers may be used depending on the specific requirements of an application of the present application of machine learning for building predictive models enabling smart failover between different network media types.

Figure 14:
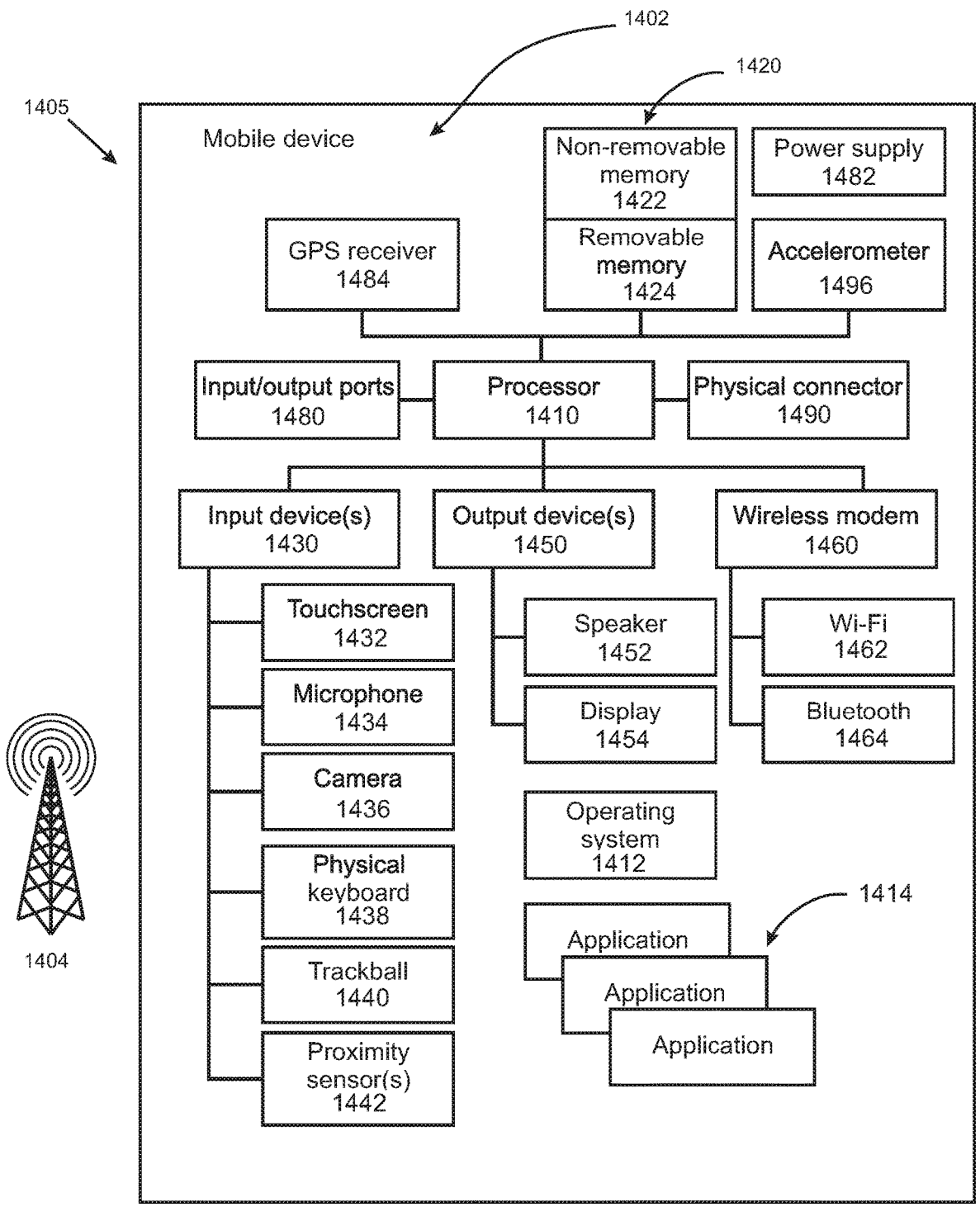
FIG. 14 is a block diagram of an illustrative user computing device such as a mobile phone or smartphone that may be used in part to implement the present application of machine learning for building predictive models enabling smart failover between different network media types.

FIG. 14 is a functional block diagram of an illustrative computing device 1405 such as a mobile phone, smartphone, or other computing device including a variety of optional hardware and software components, shown generally at 1402, which may access a remote server. Any component 1402 in the computing device can communicate with any other component, although, for ease of illustration, not all connections are shown. The computing device can allow wireless two-way communications with one or more mobile communication networks 1404, such as a cellular or satellite network.

The illustrated device 1405 can include a controller or processor 1410 (e.g., signal processor, microprocessor, microcontroller, ASIC (Application Specific Integrated Circuit), or other control and processing logic circuitry) for performing such tasks as signal coding, data processing, input/output processing, power control, and/or other functions. An operating system 1412 can control the allocation and usage of the components 1402, including power states, above-lock states, and below-lock states, and provides support for one or more application programs 1414. The application programs can include common mobile computing applications (e.g., image-capture applications, e-mail applications, calendars, contact managers, web browsers, messaging applications), or any other computing application.

The illustrated device 1405 can include memory 1420. Memory 1420 can include non-removable memory 1422 and/or removable memory 1424. The non-removable memory 1422 can include RAM, ROM, Flash memory, a hard disk, or other well-known memory storage technologies. The removable memory 1424 can include Flash memory or a Subscriber Identity Module (SIM) card, which is well known in GSM (Global System for Mobile communications) systems, or other well-known memory storage technologies, such as "smart cards." The memory 1420 can be used for storing data and/or code for running the operating system 1412 and the application programs 1414. Example data can include web pages, text, images, sound files, video data, or other data sets to be sent to and/or received from one or more network servers or other devices via one or more wired or wireless networks.

The memory 1420 may also be arranged as, or include, one or more computer-readable storage media implemented in any method or technology for storage of information such as computer-readable instructions, data structures, program modules or other data. For example, computer-readable media includes, but is not limited to, RAM, ROM, EPROM, EEPROM, Flash memory or other solid state memory technology, CD-ROM (compact-disc ROM), DVD, (Digital Versatile Disc) HD-DVD (High Definition DVD), Blu-ray, or other optical storage, magnetic cassettes, magnetic tape, magnetic disk storage or other magnetic storage devices, or any other medium which can be used to store the desired information and which can be accessed by the device 1405.

The memory 1420 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The device 1405 can support one or more input devices 1430—such as a touchscreen 1432; microphone 1434 for implementation of voice input for voice recognition, voice commands, and the like; camera 1436; physical keyboard 1438; trackball 1440; and/or proximity sensor 1442; and one or more output devices 1450—such as a speaker 1452 and one or more displays 1454. Other input devices (not shown) using gesture recognition may also be utilized in some cases. Other possible output devices (not shown) can include piezoelectric or haptic output devices. Some devices can serve more than one input/output function. For example, touchscreen 1432 and display 1454 can be combined into a single input/output device.

A wireless modem 1460 can be coupled to an antenna (not shown) and can support two-way communications between the processor 1410 and external devices, as is well understood in the art. The modem 1460 is shown generically and can include a cellular modem for communicating with the mobile communication network 1404 and/or other radio-based modems (e.g., Bluetooth 1464 or Wi-Fi 1462). The wireless modem 1460 is typically configured for communication with one or more cellular networks, such as a GSM network for data and voice communications within a single cellular network, between cellular networks, or between the device and a public switched telephone network (PSTN).

The device can further include at least one input/output port 1480, a power supply 1482, a satellite navigation system receiver 1484, such as a GPS receiver, an accelerometer 1496, a gyroscope (not shown), and/or a physical connector 1490, which can be a USB port, IEEE 1394 (FireWire) port, and/or an RS-232 port. The illustrated components 1402 are not required or all-inclusive, as any components can be deleted and other components can be added.

Various exemplary embodiments of the present application of machine learning for building predictive models enabling smart failover between different network media types are now presented by way of illustration and not as an exhaustive list of all embodiments. An example includes a method performed by a computing device configured with a network interface for wireless connectivity to a network, comprising: maintaining a current wireless connection to an access point; receiving information that describes connectivity heuristics for access points operable inside a geofence of the computing device and for devices which share at least some hardware or software characteristics with the computing device; passively monitoring one or more layers of one or more network stacks to gather statistics that describe performance of the access point; predicting a future failure of the current wireless connection with the access point by comparing the gathered statistics with the connectivity heuristics to identify indications of a decrease in network performance below a threshold; and switching to a new access point before the current wireless connection fails responsively to the prediction.

In another example, the received information includes performance data for the access points, and in which the prediction that the wireless connection with the access point will subsequently fail includes making a determination of one or more of link speeds for the wireless connection being relatively slower, or aggregate Round-Trip Time (RTT) for the wireless connection being relatively longer, than the relative link speeds or RTT included in the performance data for the access point. In another example, the access points are identified using service set identifiers (SSIDs) or basic service set identifiers (BSSIDs). In another example, the method further comprises load balancing across available access points operable inside the geofence while passively monitoring one or more layers of the multiple network stacks associated with a currently utilized access point. In another example, the method further comprises periodically switching access points based on changes in context that impact access point performance, wherein the context includes one or more of a time of day or day of the week. In another example, the passive monitoring of the one or more layers of the multiple network stacks includes monitoring one or more of DNS (Domain Name Service) queries or SMTP (Simple Mail Transfer Protocol) packets. In another example, the received information is based on crowd-sourced historical data that is placed within a model for utilization as a reference for the computing device and which enables the computing device to execute a self-learning loop when monitoring for indications of decreased performance of the access point, in which the model includes profiles that include one or both of access point information or information about devices that share at least some hardware or software characteristics to the computing device.

A further example includes one or more hardware-based non-transitory computer-readable memory devices storing instructions which, when executed by one or more processors disposed in a computing device, cause the computing device to: receive network information for a plurality of access devices and a plurality of other computing devices, in which the network information includes a model of aggregated statistics created using crowd-sourced data for the plurality of access devices and the plurality of other computing devices, in which the plurality of other computing devices for the crowd-sourced data commonly share at least some hardware or software characteristics with the computing device; passively monitor for indications that a current connection to an access device has failed or will subsequently fail by analyzing operations at network layers without the creation and transmission of test data packets by the computing device; and self-heal when there is an indication that the current connection to the access device will subsequently fail or has failed, wherein the self-healing includes selecting a new access device for connection from a plurality of available access devices according to the model of aggregated statistics, in which the plurality of available access devices span across different network media types.

In another example, the monitoring further includes analyzing multiple distinct network protocols and specific layers in those multiple distinct network protocols to passively monitor indications that the current connection has failed or will subsequently fail. In another example, the computing device utilizes available access devices for load balancing traffic using information derived from the passive monitoring and the model in the received network information. In another example, the model is further based on observed connection performance for access devices at times of day when the plurality of other computing devices connects to and respectively utilize the plurality of access devices. In another example, the received network information identifies a plurality of alternative access devices and further includes performance parameters including link speed and Round-Trip Time (RTT) for each of the alternative access devices, and wherein the indications that the current connection has failed or will subsequently fail are defined as the current connection having one or more parameters that perform relatively inferiorly to respective one or more parameters of the alternative access devices. In another example, the model is created using the aggregated statistics using machine learning including unsupervised, supervised, and reinforcement learning techniques, in which the machine learning identifies performance patterns for respective access device operations. In another example, the identified performance patterns for respective access device operations are further based on specific types of computing devices, implemented software on the computing devices, or computing device hardware. In another example, users are enabled to override the new access device selected from the self-healing by manually selecting an access device for connection. In another example, a self-learning loop is implemented that causes the computing device to connect to a new access device of a different media type that experiences increased network performance relative to that of a current access device.

A further example includes a server configured to remotely collect network connectivity statistics from a plurality of computing devices, comprising: one or more processors; and one or more hardware-based memory devices storing computer-readable instructions which, when executed by the one or more processors cause the server to: aggregate information received from a plurality of computing devices, the information describing connectivity statistics for network connections and computing devices, the information for the network connections being for different types of network media and for access devices on a specific network media; sort the information by the network media type, access devices associated with the network media types, and type of computing device; apply machine learning techniques to the sorted information to create a model that enables the plurality of computing devices to predict network connectivity failure by observing one or more layers of a network stack for a pending connection; and transmit the created model to one or more of the computing devices, wherein one or more of the computing devices implements a self-learning loop using the model to predict connectivity failure and to load balance traffic over multiple connections that are operably available inside a geofence of the computing device.

In another example, the model provides performance details about connections for reference and utilization by the plurality of computing devices while using or attempting to use available connections, and the type of computing device and characteristics about different instances of computing devices are sorted within the model, in which characteristics about different instances of computing devices include first and third-party software operating on a computing device and a type of network interface used in the computing device. In another example, the plurality of computing devices are configured to predict failure of a current connection by monitoring behaviors at network stacks local to the respective computing device while connected to the current connection, and wherein the plurality of computing devices are configured for fail-over to a different available connections using the model to identify a connection that is historically more performant relative to other available connections, the performance being characterized by QoS parameters including one of RTT, link speed, bandwidth, or latency. In another example, the historically more performant connection is based on a current time and available connections that are operable inside the respective computing device's geofence.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method performed by a computing device configured with a network interface for wireless connectivity to a network, comprising:
   maintaining a current wireless connection to an access point;
   receiving information that describes connectivity heuristics for access points operable inside a geofence of the computing device and for devices which share at least some hardware or software characteristics with the computing device;
   passively monitoring one or more layers of one or more network stacks to gather statistics that describe performance of the access point;
   predicting a future failure of the current wireless connection with the access point by comparing the gathered statistics with the connectivity heuristics to identify indications of a decrease in network performance below a threshold; and
   switching to a new access point before the current wireless connection fails responsively to the prediction.

2. The method of claim 1, in which the received information includes performance data for the access points, and in which the prediction that the wireless connection with the access point will subsequently fail includes making a determination of one or more of link speeds for the wireless connection being relatively slower, or aggregate Round-Trip Time (RTT) for the wireless connection being relatively longer, than the relative link speeds or RTT included in the performance data for the access point.

3. The method of claim 1, in which the access points are identified using service set identifiers (SSIDs) or basic service set identifiers (BSSIDs).

4. The method of claim 1, further comprising load balancing across available access points operable inside the geofence while passively monitoring one or more layers of the multiple network stacks associated with a currently utilized access point.

5. The method of claim 1, further comprising periodically switching access points based on changes in context that impact access point performance, wherein the context includes one or more of a time of day or day of the week.

6. The method of claim 1, in which the passive monitoring of the one or more layers of the multiple network stacks includes monitoring one or more of DNS (Domain Name Service) queries or SMTP (Simple Mail Transfer Protocol) packets.

7. The method of claim 1, in which the received information is based on crowd-sourced historical data that is placed within a model for utilization as a reference for the computing device and which enables the computing device to execute a self-learning loop when monitoring for indications of decreased performance of the access point, in which the model includes profiles that include one or both of access point information or information about devices that share at least some hardware or software characteristics to the computing device.

8. One or more hardware-based non-transitory computer-readable memory devices storing instructions which, when executed by one or more processors disposed in a computing device, cause the computing device to:
   receive network information for a plurality of access devices and a plurality of other computing devices, in which the network information includes a model of aggregated statistics created using crowd-sourced data for the plurality of access devices and the plurality of other computing devices, in which the plurality of other computing devices for the crowd-sourced data commonly share at least some hardware or software characteristics with the computing device;
   passively monitor for indications that a current connection to an access device has failed or will subsequently fail by analyzing operations at network layers without the creation and transmission of test data packets by the computing device; and self-heal when there is an indication that the current connection to the access device will subsequently fail or has failed, wherein the self-healing includes selecting a new access device for connection from a plurality of available access devices according to the model of aggregated statistics, in which the plurality of available access devices span across different network media types.

9. The one or more hardware-based non-transitory computer-readable memory devices of claim 8, in which the monitoring further includes analyzing multiple distinct network protocols and specific layers in those multiple distinct network protocols to passively monitor indications that the current connection has failed or will subsequently fail.

10. The one or more hardware-based non-transitory computer-readable memory devices of claim 8, in which the computing device utilizes available access devices for load balancing traffic using information derived from the passive monitoring and the model in the received network information.

11. The one or more hardware-based non-transitory computer-readable memory devices of claim 8, in which the model is further based on observed connection performance for access devices at times of day when the plurality of other computing devices connects to and respectively utilize the plurality of access devices.

12. The one or more hardware-based non-transitory computer-readable memory devices of claim 8, in which the received network information identifies a plurality of alternative access devices and further includes performance parameters including link speed and Round-Trip Time (RTT) for each of the alternative access devices, and wherein the indications that the current connection has failed or will subsequently fail are defined as the current connection having one or more parameters that perform relatively inferiorly to respective one or more parameters of the alternative access devices.

13. The one or more hardware-based non-transitory computer-readable memory devices of claim 8, in which the model is created using the aggregated statistics using machine learning including unsupervised, supervised, and reinforcement learning techniques, in which the machine learning identifies performance patterns for respective access device operations.

14. The one or more hardware-based non-transitory computer-readable memory devices of claim 13, in which the identified performance patterns for respective access device operations are further based on specific types of computing devices, implemented software on the computing devices, or computing device hardware.

15. The one or more hardware-based non-transitory computer-readable memory devices of claim 8, in which the executed instructions further cause the computing device to enable users to override the new access device selected from the self-healing by manually selecting an access device for connection.

16. The one or more hardware-based non-transitory computer-readable memory devices of claim 8, in which the executed instructions further cause the computing device to implement a self-learning loop that causes the computing device to connect to a new access device of a different media type that experiences increased network performance relative to that of a current access device.

17. A server configured to remotely collect network connectivity statistics from a plurality of computing devices, comprising:
one or more processors; and
one or more hardware-based memory devices storing computer-readable instructions which, when executed by the one or more processors cause the server to:
aggregate information received from a plurality of computing devices, the information describing connectivity statistics for network connections and computing devices, the information for the network connections being for different types of network media and for access devices on a specific network media;
sort the information by the network media type, access devices associated with the network media types, and type of computing device;
apply machine learning techniques to the sorted information to create a model that enables the plurality of computing devices to predict network connectivity failure by observing one or more layers of a network stack for a pending connection; and
transmit the created model to one or more of the computing devices,
wherein one or more of the computing devices implements a self-learning loop using the model to predict connectivity failure and to load balance traffic over multiple connections that are operably available inside a geofence of the computing device.

18. The server of claim 17, in which:
the model provides performance details about connections for reference and utilization by the plurality of computing devices while using or attempting to use available connections, and
the type of computing device and characteristics about different instances of computing devices are sorted within the model, in which characteristics about different instances of computing devices include first and third-party software operating on a computing device and a type of network interface used in the computing device.

19. The server of claim 17, in which the plurality of computing devices are configured to predict failure of a current connection by monitoring behaviors at network stacks local to the respective computing device while connected to the current connection, and wherein the plurality of computing devices are configured for fail-over to a different available connections using the model to identify a connection that is historically more performant relative to other available connections, the performance being characterized by QoS parameters including one of RTT, link speed, bandwidth, or latency.

20. The server of claim 19, in which the historically more performant connection is based on a current time and available connections that are operable inside the respective computing device's geofence.

* * * * *